United States Patent
Sun et al.

(10) Patent No.: US 11,745,956 B2
(45) Date of Patent: Sep. 5, 2023

(54) TRAY HANDLING AUTONOMOUS ROBOT

(71) Applicant: Dexterity, Inc., Redwood City, CA (US)

(72) Inventors: Zhouwen Sun, Redwood City, CA (US); Cyril Nader, East Palo Alto, CA (US); Varun Uday Nayak, Palo Alto, CA (US); Alberto Leyva Arvayo, Palo Alto, CA (US); Michael Root, Sunnyvale, CA (US); Andrew Lovett, San Mateo, CA (US); Kevin Jose Chavez, Redwood City, CA (US)

(73) Assignee: Dexterity, Inc., Redwood City, CA (US)

( * ) Notice: Subject to any disclaimer, the term of this patent is extended or adjusted under 35 U.S.C. 154(b) by 135 days.

(21) Appl. No.: 17/216,503

(22) Filed: Mar. 29, 2021

(65) Prior Publication Data

US 2022/0306402 A1    Sep. 29, 2022

(51) Int. Cl.
| | |
|---|---|
| *B25J 9/16* | (2006.01) |
| *B65G 47/90* | (2006.01) |
| *B25J 13/08* | (2006.01) |

(52) U.S. Cl.
CPC .......... *B65G 47/905* (2013.01); *B25J 9/1612* (2013.01); *B25J 9/1633* (2013.01); *B25J 9/1661* (2013.01); *B25J 9/1664* (2013.01); *B25J 9/1679* (2013.01); *B25J 9/1697* (2013.01); *B25J 13/082* (2013.01); *B65G 2201/0258* (2013.01); *B65G 2203/041* (2013.01)

(58) Field of Classification Search
CPC .......... B65G 47/905; B65G 2201/0258; B65G 2203/041; B65G 47/90; B65G 47/901; B65G 47/907; B25J 9/1612; B25J 9/1633; B25J 9/1661; B25J 9/1664; B25J 9/1679; B25J 9/1697; B25J 13/082
See application file for complete search history.

(56) References Cited

U.S. PATENT DOCUMENTS

| | | |
|---|---|---|
| 3,975,045 A | 8/1976 | Abarotin |
| 4,611,377 A | 9/1986 | McCormick |
| 4,830,565 A | 5/1989 | Bucher |

(Continued)

FOREIGN PATENT DOCUMENTS

| | | |
|---|---|---|
| DE | 29519349 | 4/1996 |
| WO | 2020138344 | 7/2020 |
| WO | 2022038913 | 2/2022 |

*Primary Examiner* — Abby Y Lin
*Assistant Examiner* — Dylan M Katz
(74) *Attorney, Agent, or Firm* — Van Pelt, Yi & James LLP

(57) ABSTRACT

An autonomous tray handling robotic system is disclosed. In various embodiments, data indicating a set of output stacks to be assembled is stored, each output stack including an associated set of trays each of a corresponding tray type. Operation of one or more robots is controlled, each robot being configured to grasp, move, and place one or more trays at a time, according to a plan, to iteratively pick trays from source stacks of trays and assemble the set of output stacks, including by building each output stack by successively placing on the output stack trays picked from one or more corresponding source stacks. Each of the robots comprises a robotic arm and a tray handling end effector configured to grasp, move, and place one or more trays without assistance from another robot.

24 Claims, 12 Drawing Sheets

(56) References Cited

U.S. PATENT DOCUMENTS

| | | | |
|---|---|---|---|
| 4,918,991 A | 4/1990 | Bucher | |
| 5,984,623 A * | 11/1999 | Smith | |
| 8,308,211 B2 * | 11/2012 | Chevassu | B23K 11/314 |
| | | | 294/198 |
| 11,305,949 B1 * | 4/2022 | Menassa | B65G 1/0407 |
| 2001/0027634 A1 | 10/2001 | Hebron | |
| 2002/0117380 A1 | 8/2002 | Downs | |
| 2003/0120387 A1 | 6/2003 | Sherwin | |
| 2013/0090761 A1 | 4/2013 | Sejimo | |
| 2013/0341942 A1 | 12/2013 | Tichell Fortea | |
| 2015/0063973 A1 | 3/2015 | Girtman | |
| 2016/0167228 A1 | 6/2016 | Wellman | |
| 2016/0184992 A1 * | 6/2016 | Naderer | B25J 9/1687 |
| | | | 700/218 |
| 2018/0319601 A1 | 11/2018 | Brazeau | |
| 2019/0321971 A1 * | 10/2019 | Bosworth | B25J 9/1065 |
| 2019/0322451 A1 | 10/2019 | Bastian, II | |
| 2020/0070361 A1 | 3/2020 | Menon | |
| 2020/0269429 A1 | 8/2020 | Chavez | |
| 2020/0286192 A1 * | 9/2020 | Roy | B25J 9/023 |
| 2020/0338755 A1 | 10/2020 | Behringer | |
| 2021/0354917 A1 * | 11/2021 | Chirol | B65G 57/22 |
| 2022/0134579 A1 | 5/2022 | Cao | |

* cited by examiner

TRAY HANDLING AUTONOMOUS ROBOT

BACKGROUND OF THE INVENTION

In certain warehouse and similar operations, a set of tasks sometimes referred to herein as "line kitting" may be performed to assemble stacked trays of items for further distribution, such as delivery to a retail point of sale. Stacks of trays containing the same type of item may be received, and trays may be drawn from different homogeneous stacks each having trays of items of a corresponding type to assemble a mixed stack of trays, e.g., to be sent to a given destination.

For example, a bakery may bake different types of products and may fill stackable trays each with a corresponding homogeneous type of product, such as a particular type of bread or other baked good. Stacks of trays may be provided by the bakery, e.g., to a distribution center. One stack may include trays holding loaves of sliced white bread, another may have trays holding loaves of whole wheat bread, still another tray holding packages of blueberry cupcakes, etc. Trays may be drawn from the various stacks to assemble a (potentially) mixed stack of trays. For example, a stack of six trays of white bread, three trays of whole wheat, and one tray of blueberry cupcakes may be assembled, e.g., for delivery to a retail store.

While the above example involves trays of different types of baked good, in other line kitting operations stackable trays may hold other products.

In a typical approach, trays are handled by human workers. The trays may include handholds to enable a human worker to grasp and move trays, e.g., by placing the workers hand on or in the handhold. Such work by human workers may cause fatigue or injuries, may take a lot of time to complete, and could be error prone.

BRIEF DESCRIPTION OF THE DRAWINGS

Various embodiments of the invention are disclosed in the following detailed description and the accompanying drawings.

DETAILED DESCRIPTION

Figure 1A:
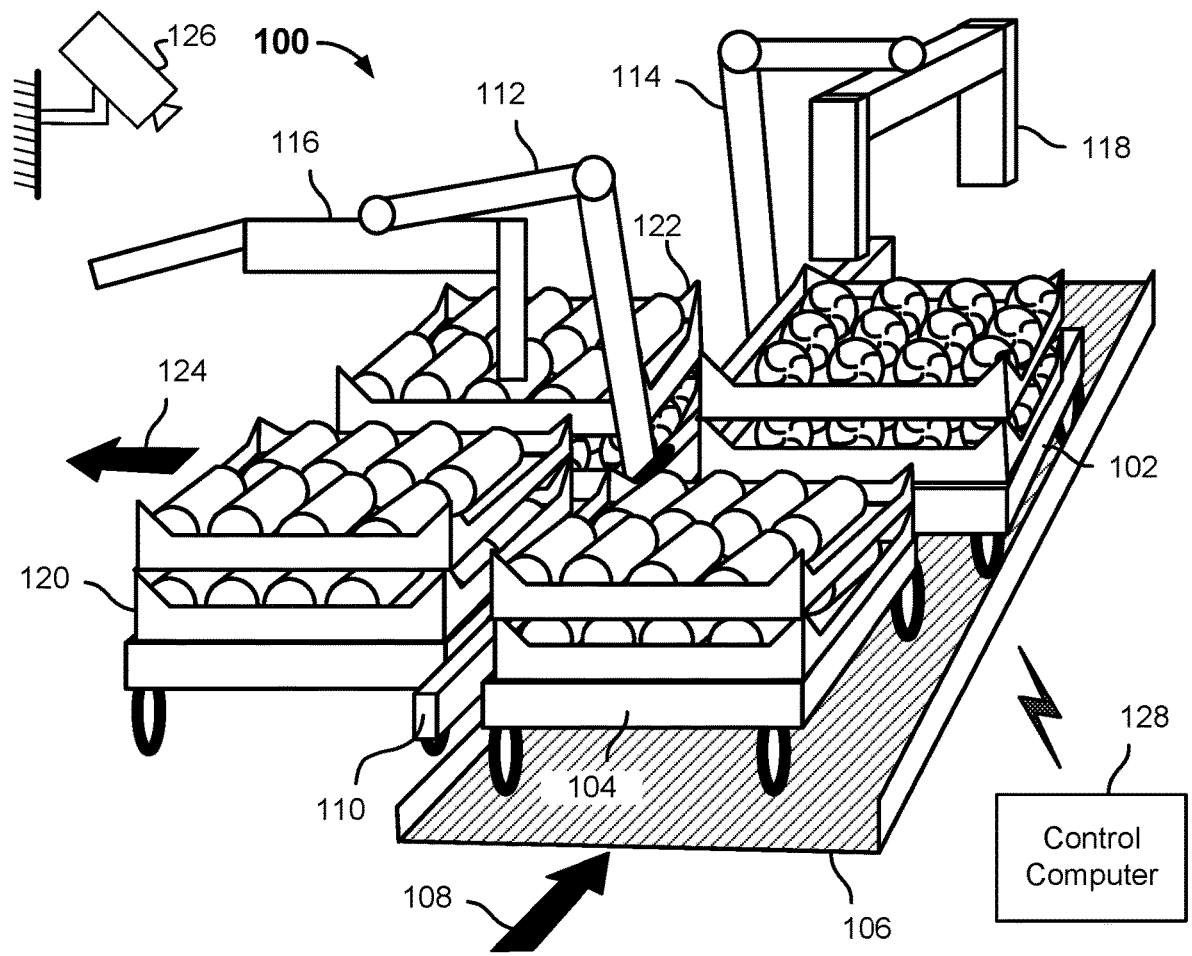
FIG. 1A is a block diagram illustrating an embodiment of a robotic line kitting system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

An autonomous, tray handling, line kitting robot is disclosed. In various embodiments, a line kitting robot as disclosed herein includes a robotic arm having an end effector as disclosed herein comprising structures to grasp a tray of items. In various embodiments, one or more such robots may operate together in a single workspace to grasp trays from source stacks and move them, singly or in groups, to destinations stacks assembled according to invoice, manifest, or other input data indicating the output stacks required to be assembled. In some embodiments, two or more robots as disclosed herein may operate on the same rail or other transport structure. Operation is coordinated to avoid collisions and to make efficient use of all robots to complete an overall set of line kitting tasks, such as to assemble a plurality of output stacks each having a corresponding mix of trays according to input information, such as invoices, manifests, etc.

In various embodiments, a tray handling robotic system as disclosed herein includes a single rail system occupied by multiple robots coordinating the fulfilment of trays containing packaged food goods, or any other commercial goods or other items. The trays may arrive in stacks of various heights and stacked in various orientations. In some embodiments, the system is divided into two sides: an input side where homogenous stacks come in and an output side that is dedicated to various customers and/or other destinations and is formed by kitting various products from the input side based on an order list, for example.

In some embodiments, multiple robots operate on the same rail or other transport system. For example, two or more robots may operate on the same rail system. Each robot is mounted on a chassis that can be moved along the rail under robotic control, independently of each other robot. The robots are aware of each other and coordinate their motions to optimize order fulfillment. Each robot makes use of a single tray gripper designed to grasp trays. In various embodiments, the gripper is modular and can be adapted to a variety of different trays.

FIG. 1A is a block diagram illustrating an embodiment of a robotic line kitting system. In the example shown, system 100 includes source tray stacks 102, 104 moving along an input stack conveyance 106 fed in this example from an input end (staging and loading area) 108. Each of the source tray stacks 102, 104 in this example is shown to be stacked on a wheeled cart or chassis. In various embodiments, the tray stacks 102, 104 may be pushed manually onto the conveyance 106, which may be a conveyor belt or other structure configured to advance the source tray stacks 102, 104 through the workspace defined by conveyance 106. In some embodiments, the chassis or other base structure on which the source trays are stacked may be self-propelled. In some embodiments, source tray stacks 102, 104 may be advanced through/by conveyance 106 under robotic control. For example, the speed and times at which the source tray stacks 102, 104 are advanced by/through conveyance 106 may be controlled to facilitate efficient grasping of trays from the source tray stacks 102, 104.

In the example shown, a single rail 110 is disposed along one long side of the conveyance 106. In this example, two robots, one comprising robotic arm 112 and another comprising robotic arm 114, are mounted movably, independent of one another, on rail 110. For example, each robotic arm 112, 114 may be mounted on a self-propelled chassis that rides along rail 110. In this example, each robotic arm 112, 114 terminates with a tray handling end effector 116, 118. In various embodiments, the tray handling end effector 116, 118 is operated under robotic control to grasp one or more trays from a source tray stack 102, 104. As shown in FIG. 1A, each end effector 116, 118 includes a lateral member attached to the end of the robotic arm 112, 114. A side member is mounted on each end of the lateral member. As shown, at least one of the side members is opened or closed under robotic control, in various embodiments, to enable a tray to be grasped (by closing the side member) or released (by opening the side member).

In various embodiments, each end effector 116, 118 includes one non-moving ("passive") side member and one movable ("active") side member. In this example, the movable or "active" side member swings open (position in which end effector 116 is shown), e.g., to enable the end effector to be placed in position to grasp one or more trays, and swings closed (position in which end effector 118 is shown), e.g., to complete a grasp of one or more trays.

In various embodiments, each end effector 116, 118 includes on each side member one or more protrusions or similar structures of a size and shape such that the protrusion, etc., fits into and, in various embodiments, can be slid under robotic control into holes or other openings in the sides the tray(s) to be grasped. For example, in some embodiments, protrusions on the inner face of the side members, sometimes called "thumbs" herein, may be slotted into handholds (e.g., holes sized to accommodate a human hand) on opposite sides of a tray, as described and illustrated more fully below.

In various embodiments, the respective robots 112, 114 are operated at the same time, fully autonomously, to pick trays from source tray stacks 102, 104 and place them on destination tray stacks, such as stacks 120, 122, in a destination tray stack assembly area on an opposite side of rail 110 from conveyance 106 and source tray stacks 102, 104. The destination tray stacks may be assembled, in various embodiments, according to invoice, manifest, order, or other information. For example, for each of a plurality of physical destinations (e.g., retail stores), a destination stack associated with that destination (e.g., according to an order placed by the destination) is built by selecting trays from respective source tray stacks 102, 104 and stacking them on a corresponding destination tray stack 120, 122. Completed destination tray stacks 120, 122 may be removed from the destination tray stack assembly area, as indicated by arrow 124, e.g., to be place on trucks, rail cars, containers, etc. for delivery to a further destination, such as a retail store.

Referring further to FIG. 1A, in the example shown in the system 100 includes a control computer 128 configured to communicate wirelessly with robotic elements comprising system 100, including in various embodiments one of more of conveyance 106; the wheeled chassis on which source tray stacks 102, 104 are stacked (if self-propelled); the robotic arms 112, 114 and/or the respective chassis on which the robotic arms 112, 114 are mounted on rail 110; and the robotically controlled tray handling end effectors 116, 118. In various embodiments, the robotic elements are controlled by control computer 128 based on input data, such invoice, order, and/or manifest information, as well as input state information, such inventory data indicating which source tray stacks include which type and/or quantity of product.

In various embodiments, source tray stacks 102, 104 may be inserted into a gate or other ingress/control structure at the input end 108 of conveyance 106. Conveyance 106 may comprise an apparatus (stack mover) that moves the source tray stacks 102, 104 along the rail 110 to optimize throughput and minimize robot displacement, e.g., by minimizing how far and/or often the robotic arms 112, 114 must be moved along rail 110 to grasp source trays and place them on respective destination stacks. The source tray stacks 102, 104 can come in with trays in different orientations/weights/ and weight distribution. The system 100 uses force and moment control to operate robotic arms 112, 114 to insert a thumb or other protrusion gently and securely into a tray and plans its motion and tray trajectory in order to not collide with itself or the environment. In various embodiments, each robot 112, 114 operates in a very tight space of roughly 2.5 m in width and has a very light footprint. The robot utilizes its full workspace and intelligently plans its motion optimizing its grasp. It recognizes the need to perform orientation changes and handles that accordingly while avoiding obstacles. The robot moves to the correct output (destination stack 120, 122) corresponding to the right customer while coordinating with the other robots on the rail 110. It then uses advanced force control and interactions with the environment to figure out a proper place strategy. The cycle then restarts.

In the example shown in FIG. 1A, the system 100 includes a 3D camera 126. In various embodiments, the system 100 may include a plurality of 3D (or other) cameras, such as camera 126, and may use image and depth data generated by such cameras to generate a three-dimensional view of at least relevant portions of the workspace and scene, such as the scene/state shown in FIG. 1A. In some embodiments, cameras such as camera 126 may be used to identify the contents of trays in source trays comprising a tray stack, e.g., by recognizing the size, shape, packaging, and/or labeling of such items, and/or by recognizing the shape, color, dimensions, or other attributes of the source stack trays themselves and/or by reading bar code, QR code, radio frequency tag, or other image or non-image based information on or emitted by the trays.

In various embodiments, image data generated by cameras such as camera 126 is used to move robotic arms and end effectors into a position near a tray or stack of two or more trays to be grasped and picked up from a source stack and/or to position the tray(s) near a destination at which they are to be place, e.g., at the top of a corresponding destination stack. In some embodiments, force control is used, as described more fully below, to complete the final phases of a pick/grasp episode and/or a placement episode.

While a single camera 126 mounted to a wall in the workspace of system 100 is shown in FIG. 1A, in various embodiments, multiple cameras may be mounted statically in a workspace. In addition, or instead, one or more cameras may be mounted on or near each robotic arm 112, 114, such as on the arm itself and/or on the end effector 116, 118, and/or on a structure that travels with the robotic arm 112, 114 as it is moved along rail 110.

Figure 1B:
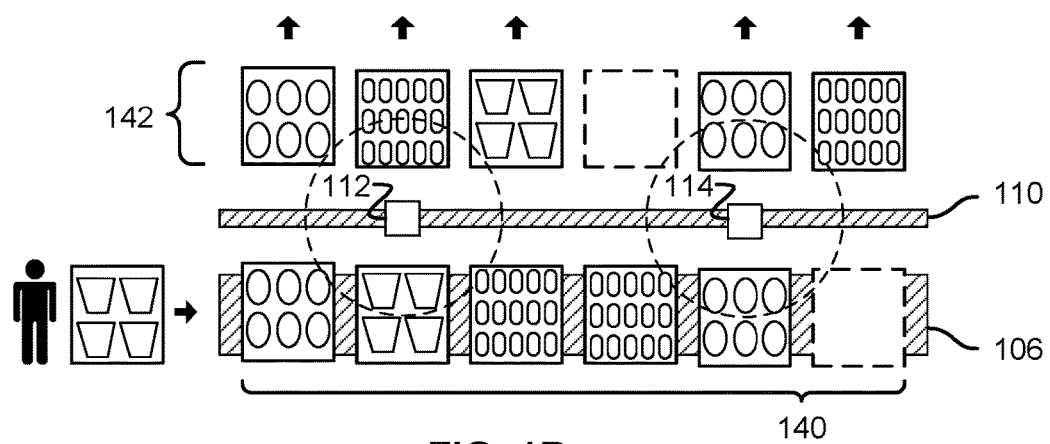
FIG. 1B is a block diagram illustrating an embodiment of a robotic line kitting system.

FIG. 1B is a block diagram illustrating an embodiment of a robotic line kitting system. In FIG. 1B, an example is shown of an overhead view of a workspace in which the system 100 of FIG. 1A may operate. In the example shown, robotic arms 112, 114 move along a common rail 110, as in FIG. 1A, to access and pick trays from source stacks 140 moving along conveyor 106 and play trays on corresponding destination stacks 142 in the destination stack assembly area on the opposite side of rail 110 from the source stacks 140 and conveyance 106. In this example, a human worker manually feeds source stacks onto the conveyance 106, but in some embodiments a robotic worker performs all or part of that task, e.g., according to plan generated programmatically to fulfill a set of orders, each associated with a corresponding destination. As destinations stacks 142 are completed, they are moved out of the destination stack assembly area, as indicated by the arrows that the top of FIG. 1B, which corresponding to arrow 124 of FIG. 1A.

While in the example shown in FIGS. 1A and 1B the trays each contain only one type of time, in other embodiments and applications source and destination trays having mixes of items may be handled to assemble destination stacks of trays as disclosed herein. Similarly, while in the example shown in FIGS. 1A and 1B the source stacks of trays each contain only trays of the same type and content, in other embodiments and applications source tray stacks may include a mix of trays and/or item types. For example, the control computer 128 may be provided with information indicating which types of tray are in which position in each source tray stack, and may use that information, along with manifest or other information indicating the required contents of each destination tray stack, to build the required destination tray stacks by picking needed trays each from a corresponding position on a source tray stack and adding the tray to a corresponding destination stack.

Figure 2A:
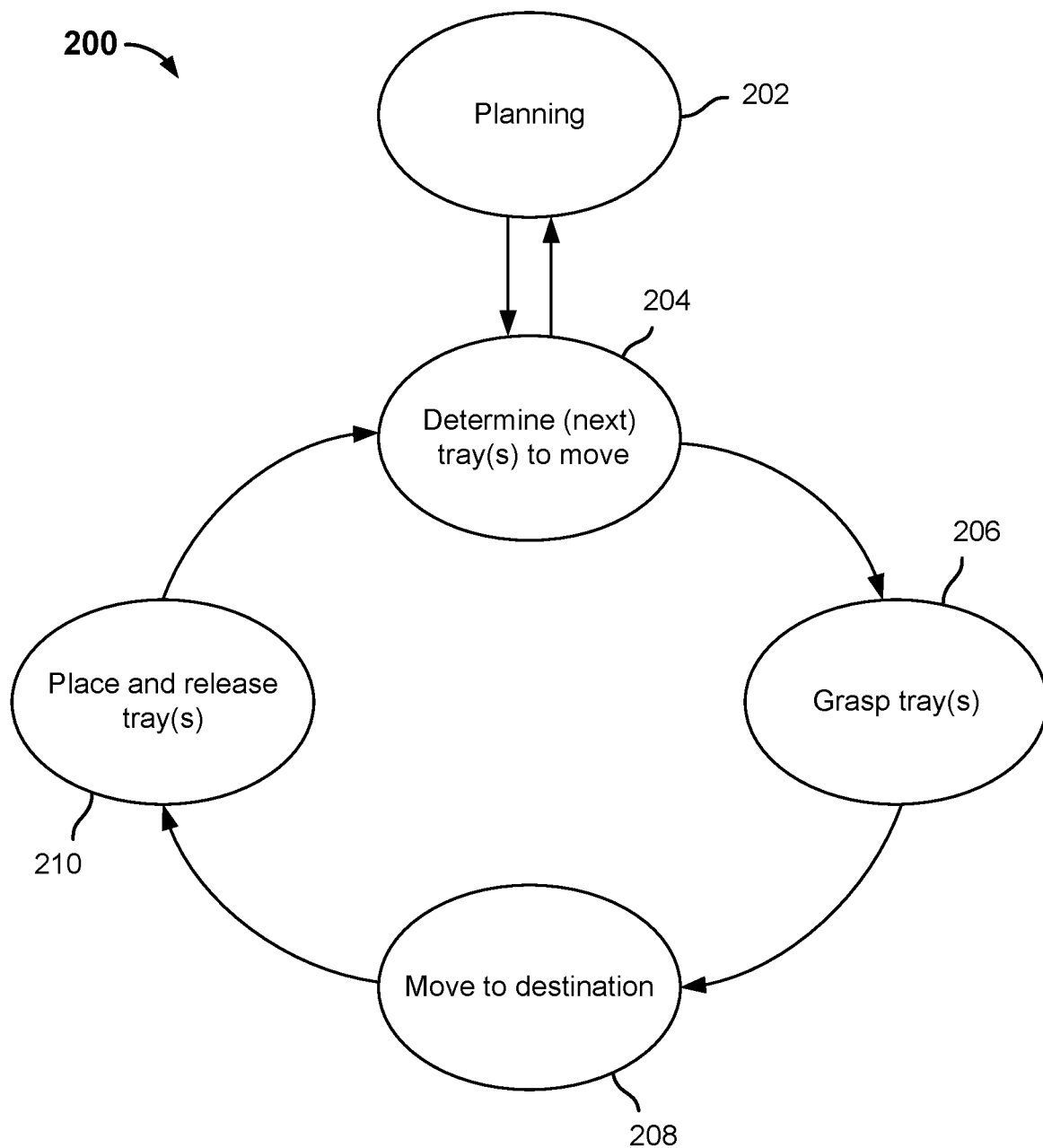
FIG. 2A is a state diagram illustrating an embodiment of an automated process to assemble stacks of trays.

FIG. 2A is a state diagram illustrating an embodiment of an automated process to assemble stacks of trays. In various embodiments, processing according to the state diagram 200 is performed by a control computer, such as computer 128 of FIG. 1A. In the example shown, a planning state, process, and/or module 202 generates and dynamically updates a plan to assemble output stacks of trays by using robotic instrumentalities as disclosed herein to pick trays from homogeneous or non-homogeneous source stacks of trays and building destination stacks each having one or more types of trays, e.g., according to a set of orders, invoices, manifests, etc. The planning state, process, and/or module 202 receives feedback indicating which destination tray stacks have been completed, which stacks of source trays have been moved into the workspace, and/or other state and context information which can be used to continuous update the plan to pick and place (stack) trays to assemble the destination stacks. In state 204, a process controlling a given robotic instrumentality (e.g., robotic arms 112 and/or 114 and associated end effectors 116 and 118, in the example shown in FIG. 1A) determines a next set of one or more trays to be move from a source stack to a destination stack according to a current overall plan as received from planning state, process, and/or module 202. For example, the robot may determine to grasp one, two, or more trays from a source stack to add them to (or start a new) destination stack. The robot enters state 206, in which a strategy and plan may be determined to do one or more of move into position to grasp the tray(s), grasp the trays, and/or begin to move them toward the destination stack location is formed; and the robot moves into position and grasps the trays. Once the tray(s) has/have been grasped, the robot enters state 208 in which the tray is moved along a planned (and, if needed, dynamically adapted) trajectory to the vicinity of the destination stack, e.g., a position hovering over the destination stack and/or a location or structure on which the destination stack is to be built. In state 210, the robot place(s) the tray(s) on the destination stack. In some embodiments, the state 210 includes maneuvers under force control to verify the tray(s) is/are place securely on the destination stack, e.g., by moving (or attempting to move) the tray(s) forward and backward (or side to side, as applicable) to ensure any interconnecting structures are aligned and well slotted, such as tabs on the bottom of the trays being placed fitting into corresponding recesses in the side walls of the tray on which the tray(s) is/are being placed. Once the trays are determined to have been placed securely, the robot releases the tray(s) and reenters the state 204, in which a next set of one or more trays is determined to be picked from a corresponding source stack and moved to a corresponding destination stack, e.g., according to overall plan information received from planning state, process, and/or module 202. In various embodiments, a robotic system as disclosed herein continues to cycle through the states 204, 206, 208, and 210 of FIG. 2A until all destination stacks have been assembled.

Figure 2B:
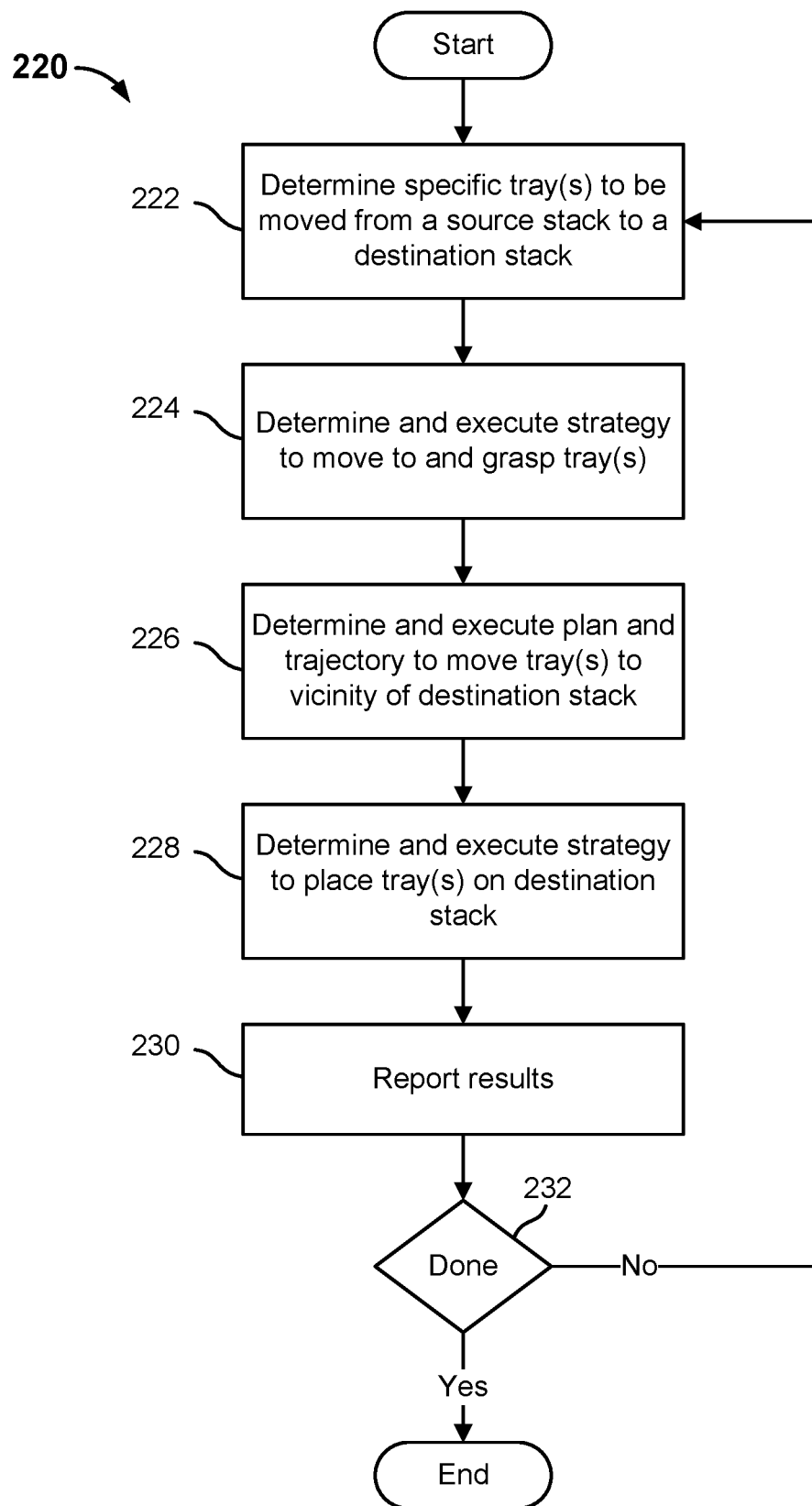
FIG. 2B is a flow diagram illustrating an embodiment of an automated process to assemble stacks of trays.

FIG. 2B is a flow diagram illustrating an embodiment of an automated process to assemble stacks of trays. In various embodiments, a process or module controlling one or more tray handling robots implements the process 220 of FIG. 2B. In various embodiments, the process 220 of FIG. 2B is performed by process or module running on a control computer, such as control computer 128 of FIG. 1A. In the example shown, at 222 a specific set of one or more trays is determined to be moved from a source stack to a destination stack. In some embodiments, a robotic arm has an end effector that accommodates picking and placing only one tray at a time. In other embodiments, a robot has an end effector that can grasp a stack of two or more trays, e.g., by grasping a bottommost one of the trays in the stack to be grasped. At 224, a strategy to move to and grasp the tray(s) is determined. For example, the robot may plan and implement a set of maneuvers to move its end effector to a position above or otherwise near the tray(s) to be grasped. A strategy to grasp the tray(s) is determined and implemented. At 226, a plan (e.g., trajectory) to move the tray(s) to a destination stack is determined and executed. The trajectory/plan takes into consideration obstacles in the workspace, such as other stacks, and potential conflicts with other robotic instrumentalities, such as another pick/place robot operating in the same workspace (e.g., robots 112, 114 of FIG. 1A). At 228, a strategy to place the tray(s) atop the corresponding destination stack is determined and executed. At 230, results of the pick/place operation are reported, e.g., to a planning process or module. Subsequent iterations of steps 222, 224, 226, 228, and 230 are repeated until it is determined at 232 that processing is done, e.g., all destination stacks have been completed.

Figure 3A:
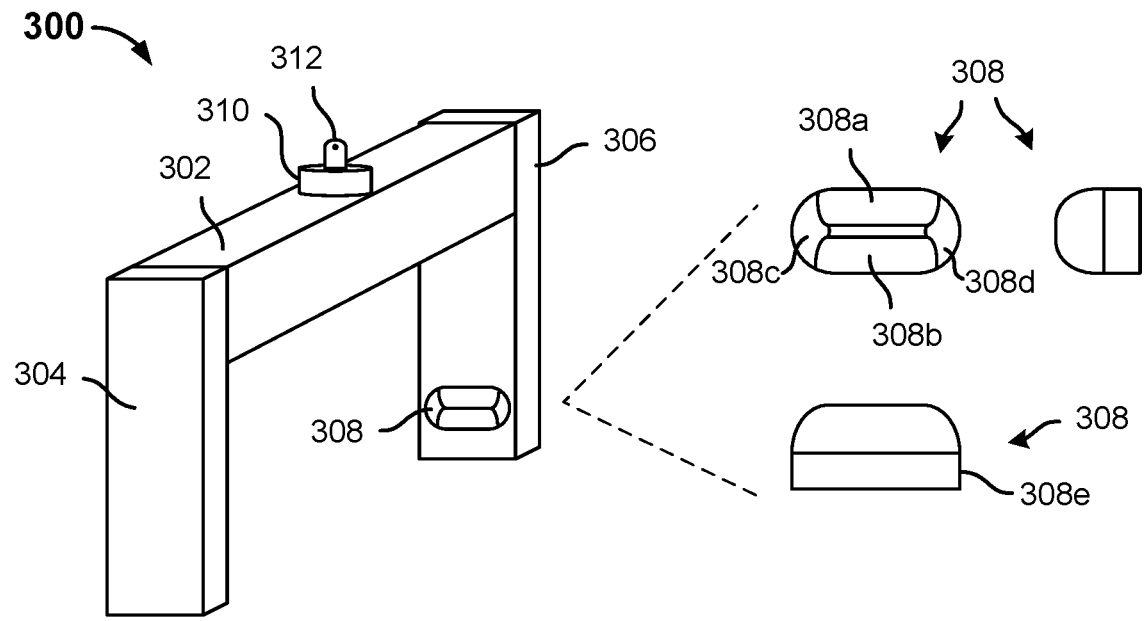
FIG. 3A is a diagram illustrating an embodiment of a robotically controlled tray handling end effector.

FIG. 3A is a diagram illustrating an embodiment of a robotically controlled tray handling end effector. In the example shown, end effector 300 includes a lateral member 302 to which a passive side member 304 is fixedly mounted and an active side member 306 is hinge or otherwise movably mounted in a manner that enables active side member 306 to be moved to an open position that facilitates moving the end effector 300 into a position to grasp a tray. An active side thumb 308 is positioned on (or comprises an integral part or feature of) an inner face of side member 306.

The active side thumb 308 and a corresponding structure on the inner face of passive side member 304, not visible in FIG. 3A, are of a size and shape suitable to be inserted into a handhold or other recess or hole on opposite sides of a tray to be grasped by the end effector 300. In various embodiments, the thumbs 308 are removable and replaceable, e.g., to be replaced once they are worn out from use or to be exchanged with a thumb having a different shape, dimensions, materials, etc. suitable to grasp a different type of tray, for example. As shown in the three-view drawing to the right of FIG. 3A, in the example shown the thumb 308 has convex surfaces 308a-d on each of four sides. In various embodiments, the convex surfaces 308a-d facilitate using force and moment control to insert the thumb 308 into a handle or other hole or recess in the side of a tray to be grasped. In some embodiments, the convex surfaces are used in conjunction with active force control and orientation impedance control to ensure a gentle and secure final grasp, where the active side is fully into the tray. For example, even if imperfectly aligned, a convex surface 308a-d engaged in a side or edge of a hole may enable the rest of the thumb 308 to more readily be slid more fully into the hole. Flat surfaces 308e at the base of the thumb, nearest the inner side wall of the side member 304, 306 on which the thumb 308 is mounted, in various embodiments enable misalignment to between the end effector 300 and the tray(s) being grasped to be corrected and/or alignment refined. For example, in a picking episode, a thumb of the passive side 304 may be moved into position near a handle or other hole on one side of the tray to be grasped. The convex faces 308a-d may be used, under force control, to slide the thumb partway into the hole. The flat surfaces 308e near the base of the thumb may be used to better align the passive side with the tray prior to closing the active side member 306.

Referring further to FIG. 3A, in the example shown end effector 300 includes a force sensor 310 mounted on lateral member 302 and a bracket 312 to attach the end effector 300 to a robotic arm. In some embodiments, end effector 300 may be attached to a robotic arm via a pin inserted through a hole in bracket 312, enabling the end effector 300 to swing freely and/or be rotated under robotic control, e.g., using one or more motors, about a longitudinal axis of the pin.

Figure 3B:
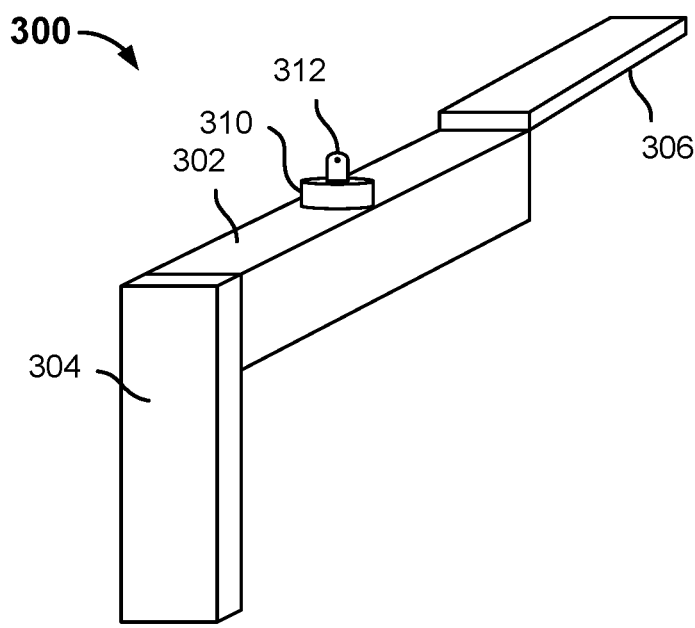
FIG. 3B is a diagram illustrating an embodiment of a robotically controlled tray handling end effector.

FIG. 3B is a diagram illustrating an embodiment of a robotically controlled tray handling end effector. In the state shown in FIG. 3B, the active side member 306 has been opened to the open position, e.g., by a pneumatic or hydraulic piston, motor, or other motive force and structure housed in lateral member 302 (not shown) in FIG. 3B.

In various embodiments, tray pick operations as disclosed herein are smooth, gentle, and precise and are tolerant to uncertainty and disturbances. In various embodiments, a pick episode includes one or more of:

- Lowering to a target pose (adjacent tray) from the hover pose (above stack) coupled with height checks to refine estimation of where the tray handle is and a dynamic goal adjustment.
- Using the active side surface of the end effector to control any uncertainties in the direction of the rail be it a misplaced tray or a human error. In various embodiments, after moving to the hover pose, the robot lowers into the position to align with the handle, and while it does this lowering motion, force control is used to ensure that the alignment in the rail direction is perfect. This can be very likely because the gripper almost perfectly fits the length of the tray in between itself, and any misalignment can lead to contact. This contact is ensured to be on the active side panel, which has a diagonal plane—meaning that we can effectively use the contact between it and the [misaligned] trays to adjust our position using force control.
- Proceeding to use a three degree of freedom (3 DOF) force controller (e.g., based on sensor readings from force sensor 310) to find the position of the (tray handle) slot on the passive side and insert the passive side thumb into the slot using the convexity of the thumb (e.g., one or more of surfaces 308 a-d, depending on which engage with the tray). In some embodiments, a 6DOF controller is used to perform XYZ force control to ensure that the thumb is inserted and XYZ axis moment to ensure that the plane of the passive side panel is flush against the plane of the tray outer surface.
- Using the flat extremities (e.g., 308e) of the thumbs to adjust for any orientation mismatch.
- When all is good, close the active side (e.g., 306) with force/moment control, to account for any residual orientation or positional uncertainty in the tray pose, and lift the tray up to make sanity checks for the quality of the grasp (e.g., weight as expected, forces and moments balanced and otherwise consistent with good grasp). In some embodiments, when the state of the gripper is deemed good, the active side is closed with force/moment control enabled in order to refine and correct for any residual orientation/position errors, which ensure gentle handling of the tray.
- The robot safely aborts the pick if it detects any anomalies related to weight or quality of the trays in the stack or the quality of the stacking itself.

Figure 4:
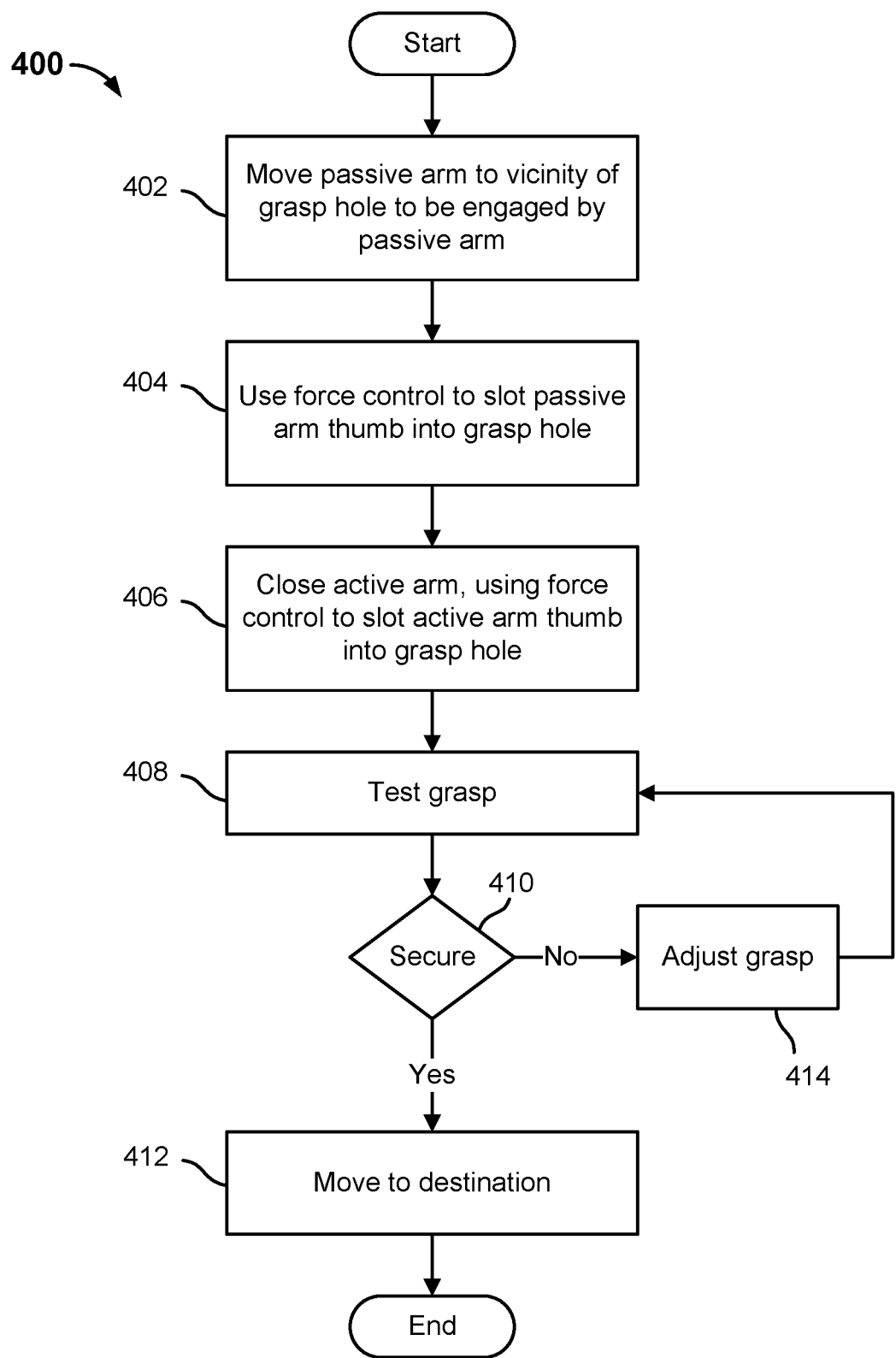
FIG. 4 is a flow diagram illustrating an embodiment of a process grasp one or more tray using a robotically controlled tray handling end effector.

FIG. 4 is a flow diagram illustrating an embodiment of a process grasp one or more tray using a robotically controlled tray handling end effector. In various embodiments, the process 400 of FIG. 4 is performed by a control computer, such as control computer 128 of FIG. 1A, e.g., to control a single-robot tray handling robot, such as robots 112, 114 of FIGS. 1A and 1B and/or a robot equipped with a tray handling end effector, such as end effector 300 of FIGS. 3A and 3B. In the example shown, at 402 a passive side member ("arm") is moved to a position near a grasp hold or other hole or recess in a side of the tray to be grasped. The active side member may be placed in an open position to facilitate moving the tray handling end effector into position without having to raise the end effector to as great a height, e.g., to clear the top of the source stack. At 404, force control is used to slot the passive side thumb (or similar protrusion or structure) into the tray hole (or recess). The insertion may include phases, including initially using convex surfaces of the thumb to slide the thumb into the hole or recess and then using force control to further and/or more fully insert the thumb into the hole or recess, including by sliding flat surfaces of the thumb into the hole or recess to ensure the end effector is fully aligned with the tray. At 406, the active side member is closed and force control is used to slot the thumb (or similar structure) of the active side member into the hole or recess on the tray on the side opposite from the passive side member. At 408, the robot tests its grasp of the tray, and if the grasp is determined at 410 to be secure the robot moves the tray to its destination at 412. If the grasp is determined at 410 not to be secure, the grasp is adjusted at 414 and tested again at 408. For example, the robot may set the tray back down on the source stack, release the tray, and attempt a new grasp. Or, the robot may set the tray at least partly on the source stack and attempt to adjust its grip without fully releasing the tray, e.g., by using force control to try to slot the passive and/or active side thumbs, respectively, more fully into the tray.

In various embodiments, a single robot tray gripping robot as disclosed herein uses a vertical workspace of 0-2.7 m, which allows it to pick very tall stacks and very low stacks while avoiding obstacles and singularity. The robot can reset itself from any given position and orientation safely and without collision using a set of tools to calculate its best reset strategy. On a given pick episode the robot will first analyze the pose of its target, confirm the target and pose, and then plan the best way to safely get to the target, using a direct paradigm that uses a combination of collision avoidance and orientation interpolation coupled with a positional trajectory if the robot is physically able to clear the tray and move to a hover position above it. If the robot recognizes that it is not able to clear tall stacks due to robot workspace limitations, it will plan a series of joint motions to position itself directly into the insertion position without needing to hover over it first.

In various embodiments, after executing checks to ensure a successful and secure grasp, the robot moves to clear the top tray remaining on the source stack using a set of rail motions orientation interpolations and collision avoidance and proceeds along a planned trajectory to the vicinity of the destination stack, e.g., a "hover" position over the top of the destination stack.

Figure 5A:
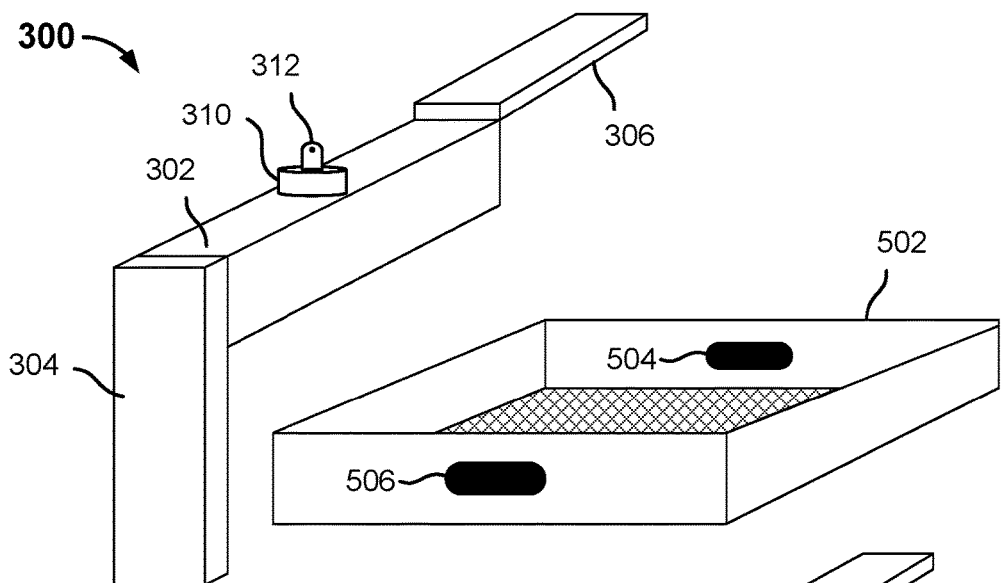
FIG. 5A is a diagram illustrating an embodiment of a robotically controlled tray handling end effector.

FIG. 5A is a diagram illustrating an embodiment of a robotically controlled tray handling end effector. In the example shown, end effector 300 of FIGS. 3A and 3B is shown in a state in which the active side member 306 is in an open position. In various embodiments, the activation of the active panel (e.g., side member 306) is performed by a cushioned two-way pneumatic cylinder. In the position as shown in FIG. 5A, the end effector 300 is near but not yet immediately adjacent to the tray 502, which in this example has handles or holes 504 and 506 on opposite sides of the tray 502.

Figure 5B:
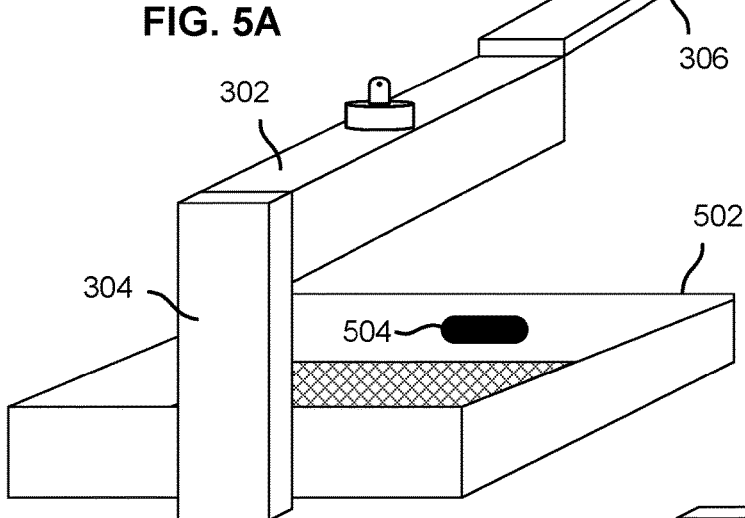
FIG. 5B is a diagram illustrating an embodiment of a robotically controlled tray handling end effector.

FIG. 5B is a diagram illustrating an embodiment of a robotically controlled tray handling end effector. In the state shown, passive side member 304 has engaged the tray 502, e.g., by slotting a thumb of passive side member 304 (not shown) into the handle or other hole 506 on the near side wall of tray 502. For example, a combination of position control to move the passive side member 304 of end effector 300 to a position near the hole 506 of tray 502 and force control to slot a thumb or other protrusion or structure of the passive side member 304 into the hole 506 may be used, in various embodiments.

Figure 5C:
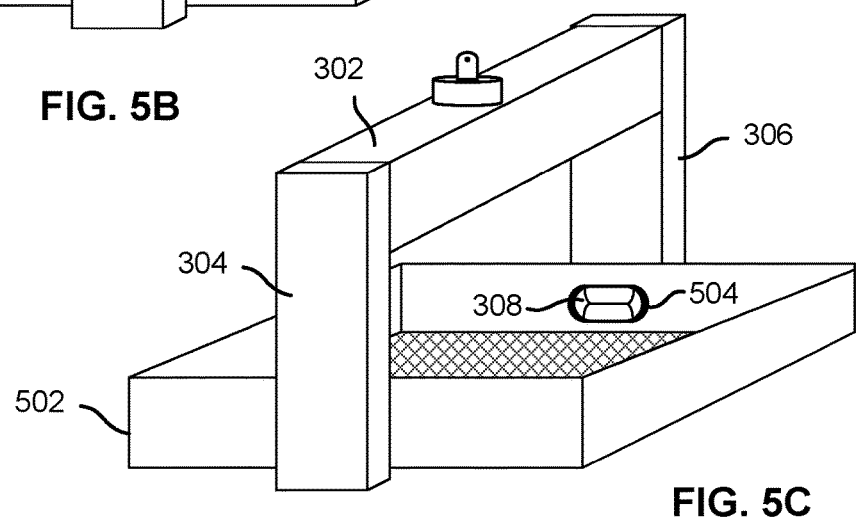
FIG. 5C is a diagram illustrating an embodiment of a robotically controlled tray handling end effector.

FIG. 5C is a diagram illustrating an embodiment of a robotically controlled tray handling end effector. In the example and state shown, the active side member 306 of end effector 300 has been closed and slotted into hole 504 of tray 502, e.g., by inserting thumb 308 of active side member 306 into the hole 504, as shown.

While a single tray is shown being grasped in FIGS. 5A through 5C, in various embodiments a single robot tray handling robot as disclosed herein may grasp two or more stacked trays, e.g., by grasping a bottommost one of them in the manner illustrated in FIGS. 5A through 5C. The robot may then lift and move the stack comprising the tray it grasped, and any trays stacked on top of the tray it grasped. In various embodiments, stability is maintained at least in part by the inner faces of the side members (e.g., 304, 306) engaging the outer faces of the trays in the stack that has been grasped.

Figure 6A:
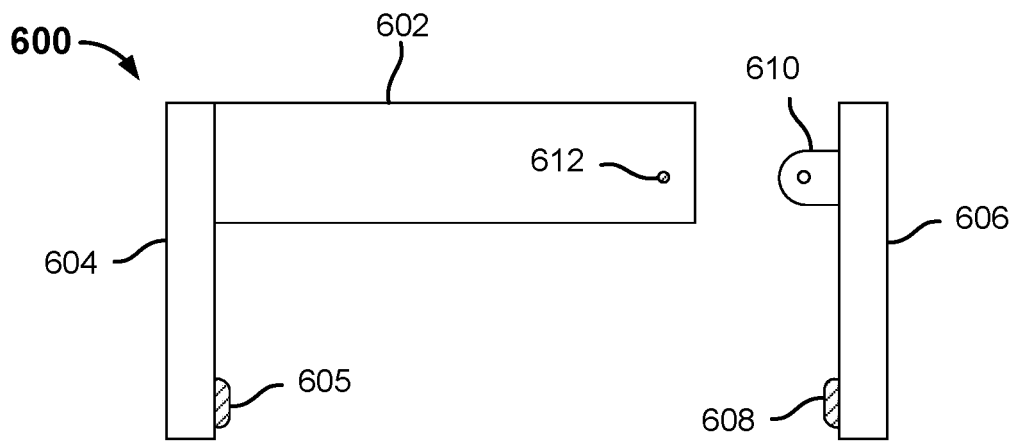
FIG. 6A is a diagram illustrating an embodiment of a robotically controlled tray handling end effector.

FIG. 6A is a diagram illustrating an embodiment of a robotically controlled tray handling end effector. In various embodiments, an end effector such as end effector 300 of FIGS. 3A and 3B may include structures as shown in FIG. 6A. In the example shown, end effector 600 includes a lateral member 602 and a passive side member 604 having a passive side thumb 605 configured to be inserted into a handle or other hole or recess on a first side of a tray. The end effector further includes an active side member 606 with an active side thumb 608. Active side member 606 includes a tab or bracket 610 mounted on the upper part of the inside face of active side member 606, which in this example is positioned to align with a hole (or set of holes) 612 through lateral member 602.

Figure 6B:
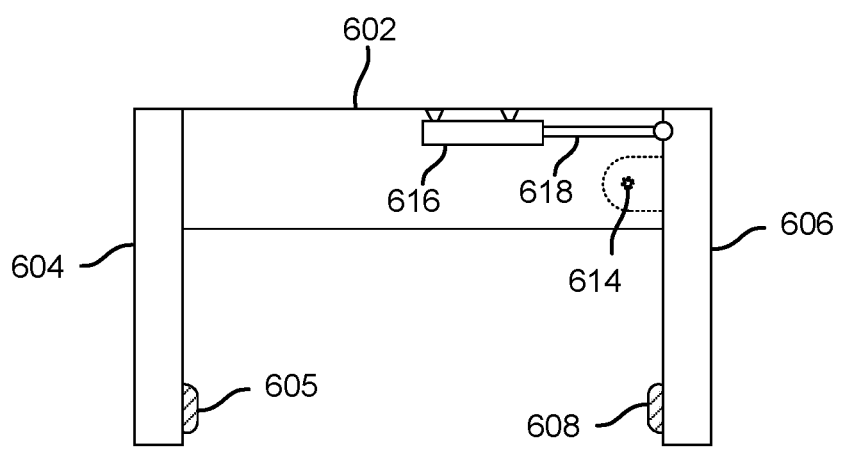
FIG. 6B is a diagram illustrating an embodiment of a robotically controlled tray handling end effector.

FIG. 6B is a diagram illustrating an embodiment of a robotically controlled tray handling end effector. In various embodiments, an end effector such as end effector 300 of FIGS. 3A and 3B may include structures as shown in FIG. 6B. In the example and state shown, end effector 600 of FIG. 6A is shown in an assembled state (and in a closed position of the active side member 606). A shoulder bolt (or hinge pin, or similar structure) 614 is shown to be inserted through hole(s) 612 and tab/bracket 610. A pneumatic or hydraulic cylinder 616 is mounted (e.g., by a pivot bracket or other bracket) to an inner surface within lateral member 602.

In various embodiments, cylinder 616 and end rod 618 comprises a cushioned two-way pneumatic cylinder. Activation of the active panel (e.g., side member 606) is performed by activating the cylinder 616. The end rod 618 of the pneumatic cylinder 616 is connected to the active panel 606. The active panel, which is rotatably connected to the lateral member via a pivot joint formed by inserting shoulder bolt 614 through hole(s) 612 and tab or bracket 610, is pushed/pulled by the pneumatic cylinder to close/open the active panel 606, respectively. The actuation of the pneumatic cylinder 616 is controlled, in various embodiments, by a four-way two-position single solenoid.

In some embodiments, an end effector such as end effector 600 includes a limit switch mounted near the active side member 606, which is positioned to be triggered when the active side member is (fully) in the closed position, as shown in FIG. 6B.

Figure 6C:
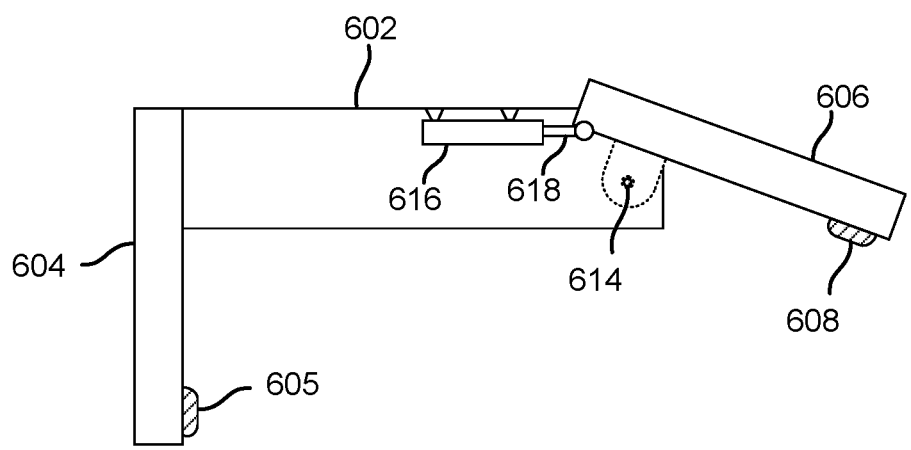
FIG. 6C is a diagram illustrating an embodiment of a robotically controlled tray handling end effector.

FIG. 6C is a diagram illustrating an embodiment of a robotically controlled tray handling end effector. In the example and state shown, the cylinder 616 has been activated to pull the end rod 618 in, resulting in the active side member 606 being pulled into the open position, as shown.

In various embodiments, the end effector 600 includes one or more infrared (IR) sensors, each comprising an active IR emitter mounted on the passive side member 604 and a corresponding reflector on the active side member 606. The IR sensor(s) is/are triggered, in some embodiments, when a tray comes into the reflective field of the sensor as the robot is trying to pick a tray. In some embodiments, two sensors are present in the passive fin 604: one sensor is located at the extremity of the fin, while the other is placed in the area where a tray would be when a tray is engaged by the gripper. A third sensor, in the thumb of active member 606, is directed such that when the active member 606 closes onto the tray, the tray's inner handle area gets in the view of the sensor thus triggering that the active member 606 has successfully engaged in the tray.

In some embodiments, the lateral member 602 and side members 604, 606 are composed of carbon fiber. The lateral member 602 comprises a hollow square beam composed of a braided carbon fiber pole that allows for torsional stiffness. The side panels 604, 606 are composed of ⅜" carbon fiber plates, machined to specification.

Figure 7A:
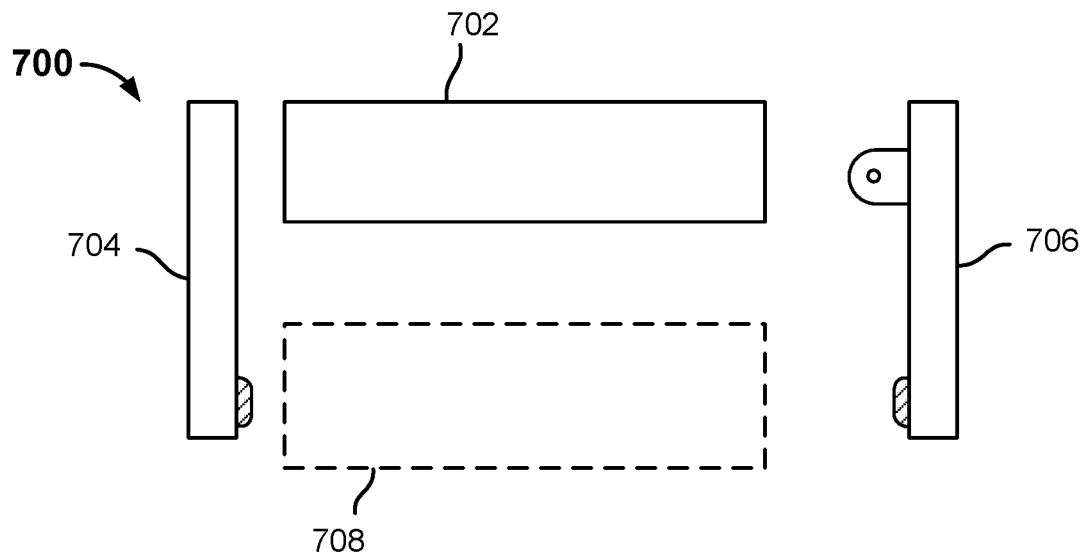
FIG. 7A is a diagram illustrating an embodiment of a robotically controlled tray handling end effector.

FIG. 7A is a diagram illustrating an embodiment of a robotically controlled tray handling end effector. In the example shown, tray handling end effector 700 includes a lateral member 702 and detachable and/or modular passive and active side members 704 and 706, respectively. As shown, the end effector 700 accommodates and is capable of being used to grasp only a single tray.

Figure 7B:
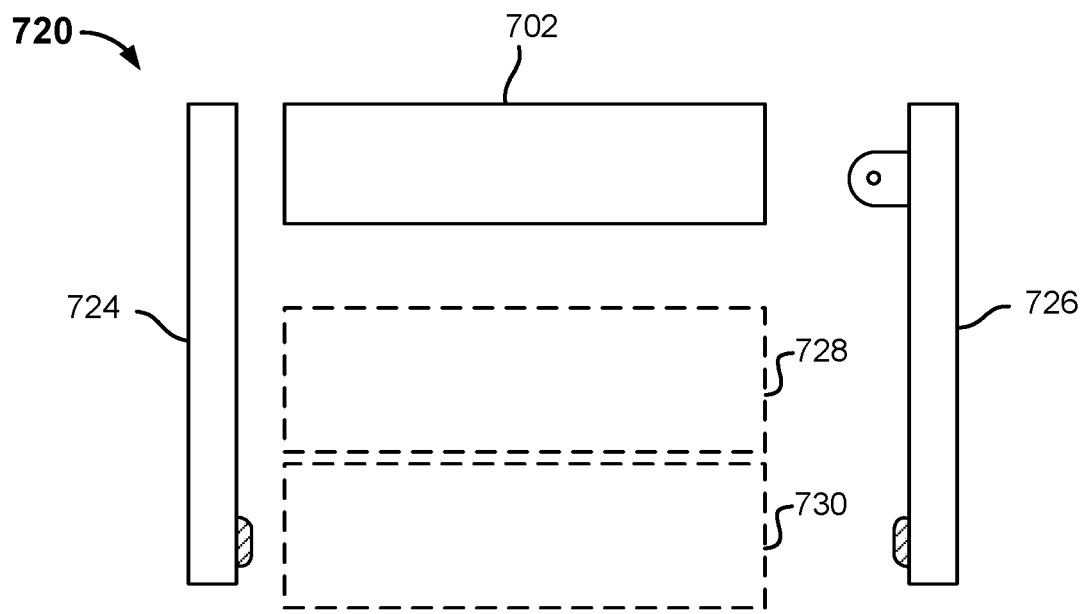
FIG. 7B is a diagram illustrating an embodiment of a robotically controlled tray handling end effector.

FIG. 7B is a diagram illustrating an embodiment of a robotically controlled tray handling end effector. In the example shown, the end effector 720 has been provided by detaching and removing the side members 704, 706 from lateral member 702 of end effector 700, and installing elongated side members 724 and 726. In the configuration shown in FIG. 7B, end effector 720 may be used to pick up at two tray high stack of trays—e.g., trays 728 and 730 in the example shown in FIG. 7B—for example, by inserting the respective thumbs of the side members 724, 726 into holes on opposite sides of the bottommost tray (i.e., tray 730 in the example shown).

Figure 8A:
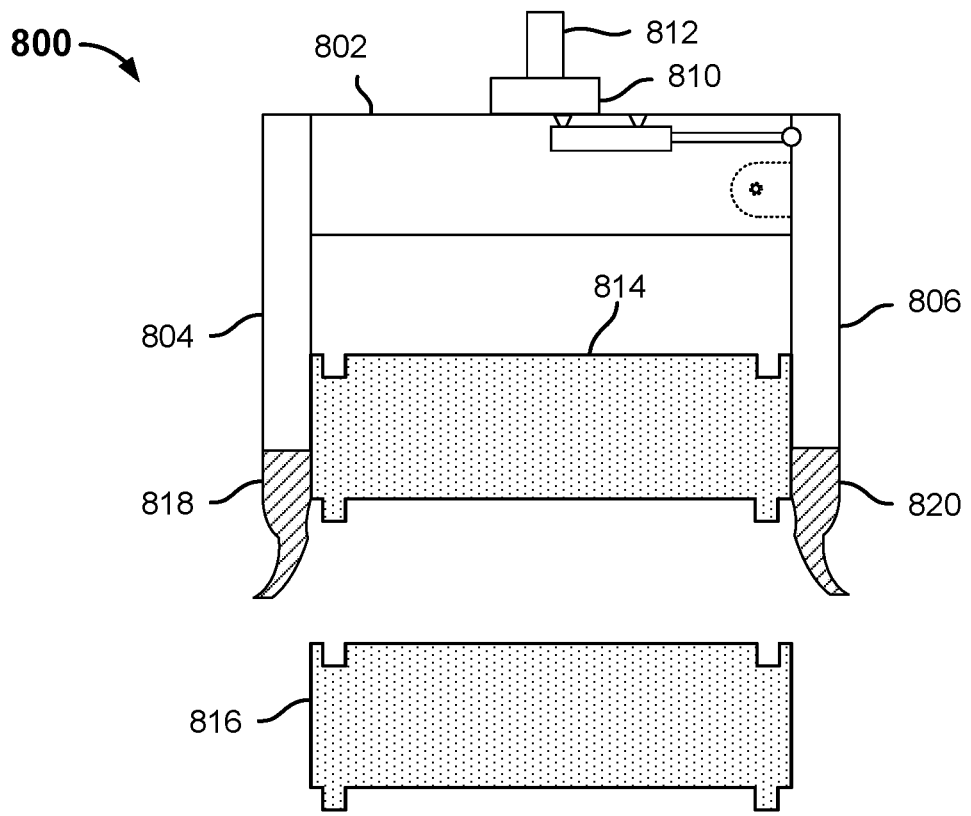
FIG. 8A is a diagram illustrating an embodiment of a robotically controlled tray handling end effector equipped with a guide fin.

FIG. 8A is a diagram illustrating an embodiment of a robotically controlled tray handling end effector equipped with a guide fin. In the example shown, tray handling end effector 800 includes a lateral member 802, passive side member 804, and active side member 806. End effector 800 is attached to a robotic arm (not shown) via a force sensor 810 and pivot bracket 812. In the state shown, end effector has in its grasp a tray 814. For example, passive and active side thumbs (not shown) of passive side 804 and active side 806, respectively, may be inserted into corresponding holes (not shown) on either side of tray 814.

In the example shown, end effector 800 further includes guide fins 818 and 820, mounted along the bottom edges of passive side member 804 and active side member 806, respectively. In various embodiments, the guide fins 818, 820 extend along all or a substantial portion of the bottom edge of the side members 804, 806. As shown, each guide fin 818, 820 has a shape that flares outward at the bottom, such that the distance between the respective bottom edges of the guide fins 818, 820 is greater than the width of the tray 814 and the distance between the inner faces of the passive and active side members 804, 806 when in the closed position, as shown.

As shown in FIG. 8A, the end effector 802 is being used to position the tray 814 over tray 816, e.g., to place the tray 814 onto the tray 816. For example, the tray 816 may be the topmost tray on a destinate stack to which the tray 814 is to be added.

Figure 8B:
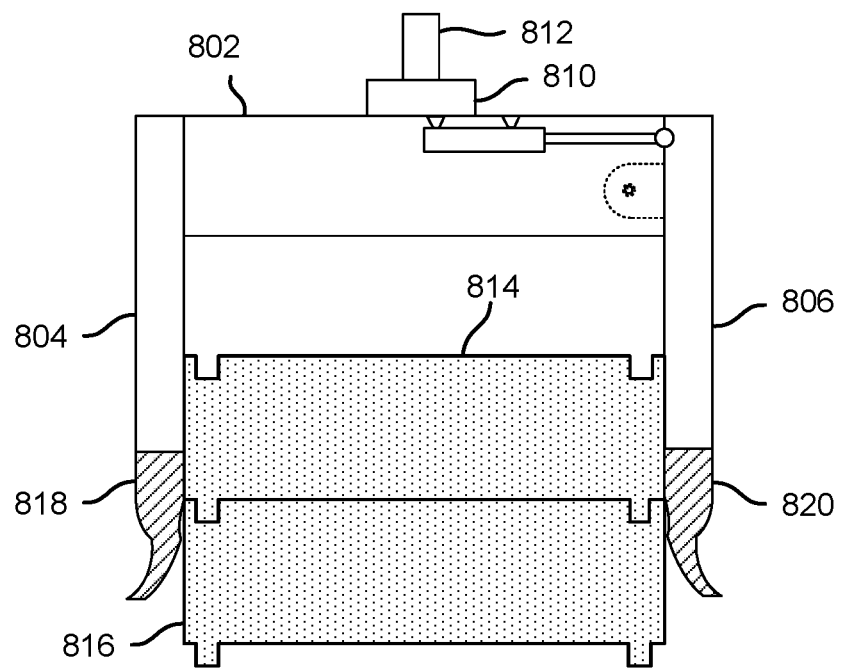
FIG. 8B is a diagram illustrating an embodiment of a robotically controlled tray handling end effector equipped with a guide fin.

FIG. 8B is a diagram illustrating an embodiment of a robotically controlled tray handling end effector equipped with a guide fin. In the example and state shown in FIG. 8B, the guide fins 818, 820 have facilitated the use of force control to align and place the tray 814 onto tray 816, as shown. In various embodiments, the fins 818, 820 have a certain degree of compliance that facilitates the placing of trays. The fins are designed in various embodiments to have flexure properties to increase operation speed and tolerances as well as accuracy.

In various embodiments, tray place episodes by a single robot tray gripping robot as disclosed herein are smooth, gentle, and precise and tolerant to uncertainty and wobbling. In various embodiments, a place episode includes one or more of:

Using force control to go down from a hover position above the destination stack (e.g., as shown in FIG. 8A) and making contact with the guide fins (e.g., one or both of guide fins 818, 820) first.

The guide fins 818, 820 help to guide the tray being placed into a position more aligned with the tray on which the tray being placed is to be place, and the guide fins 818, 820 also provide feedback signals via the load cell 810 to adjust the position of the incoming tray on top of the stack.

Using force control, the robot makes steady contact with the destination stack and gently inserts the tray (e.g., 814) onto it.

Figure 9:
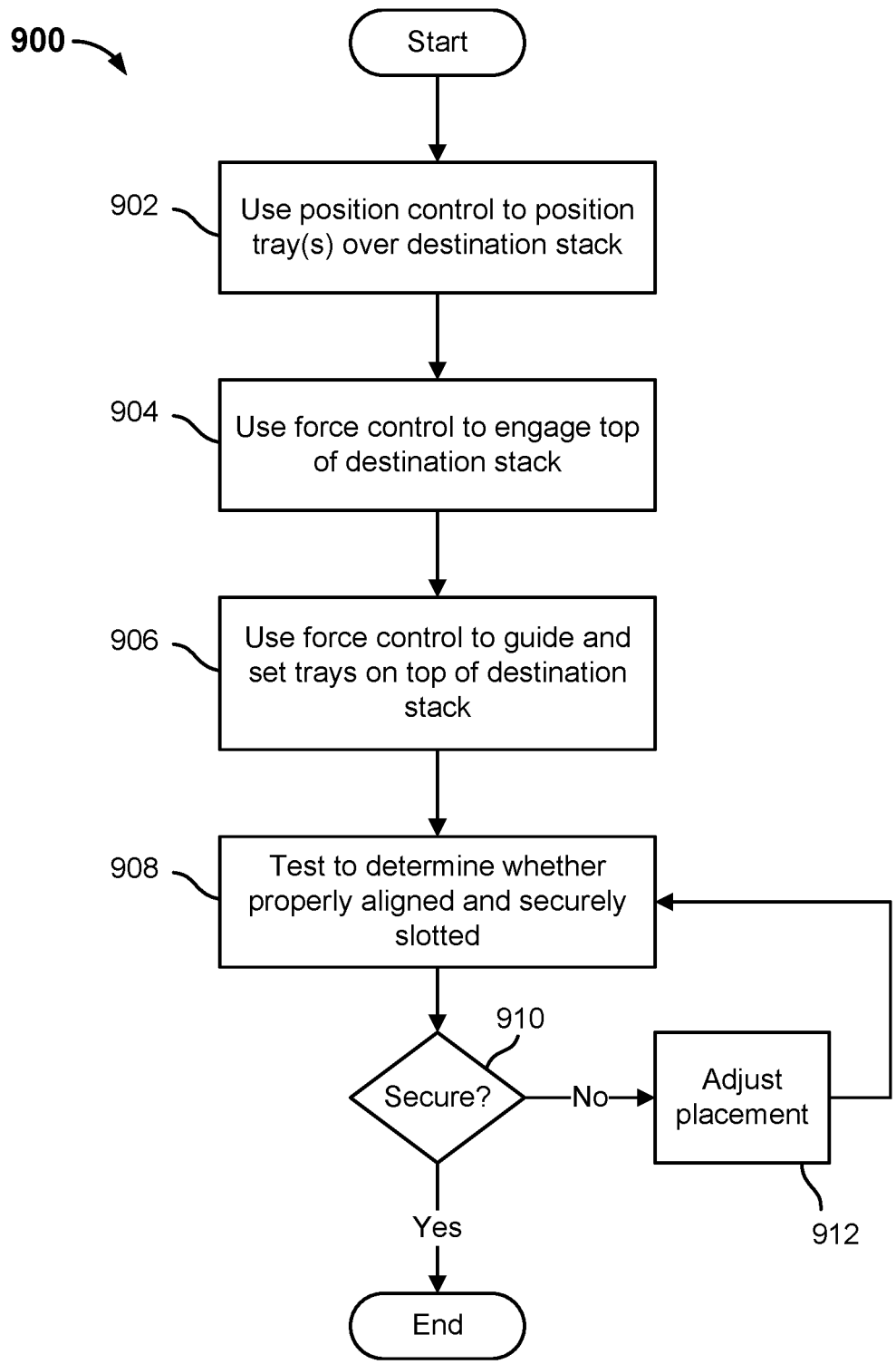
FIG. 9 is a flow diagram illustrating an embodiment of an automated process to place one or more trays on a stack.

FIG. 9 is a flow diagram illustrating an embodiment of an automated process to place one or more trays on a stack. In various embodiments, the process 900 of FIG. 9 is performed by a control computer, such as control computer 128 of FIG. 1A, configured to control one or more single robot tray handling robots, as disclosed herein. In the example shown, at 902 position control is used to position one or more trays to be placed, e.g., on the top of a destination stack. For example, 3D camera and/or other image data may be used to determine a position and orientation of the destination stack, and the robot may be moved (e.g., along a rail) into a position near the destination stack and then the robotic arm maneuvered to position the tray above the destination stack. At 904, force control is used to engage the top of the destination stack. For example, referring to the example shown in FIGS. 8A and 8B, the tray 814 may be lowered until the bottom edge of one or both of the guide fins 818, 820 just touches the tray 816 at the top of the destination stack. At 906, force control is used to guide and set the tray (e.g., tray 814) onto the top of the destination stack (e.g., top of tray 816). At 908, the robot tests to determine whether the tray being placed is fully and properly aligned with and securely slotted into the top of the topmost tray of the destination stack.

In various embodiments, the slotting episode (e.g., 908) serves to ensure the stability of the tray on top of the stack and its proper insertion. After the adjustment in the z axis (up/down) and the y axis (axis along rail along with the trays slot, e.g., the axis into and out of the page as shown in FIGS. 8A and 8B) the robot executes a routing to ensure that the third direction (x axis, side to side as shown in FIGS. 8A and 8B) is also stable. In various embodiments, a slotting episode includes:

- Gently pull the tray back on top of the slot as it was placed in an offset position forward with respect to the stack.
- Series of force motions to get the tray unstuck and moving smoothly; if force feedback indicates the tray is overslotted, corrective action is performed to reverse the slot. For example, if the system fails to find a notch at the back of the tray and there is an equivalent notch at the front of the tray, the system tries to "slot" against it by reversing the direction of slotting motion.
- The quality of the slot is verified by moving the tray forward and backward and analyzing the resulting force signals. In various embodiments, the robot learns and/or is manually trained to recognize force signals indicative of secure (or not secure) slotting.

If the tray is determined to have been securely slotted (910), the robot releases the tray (e.g., opens the active side and withdraws the passive side thumb from the hole into which it was inserted) and the process ends. If not (910), at 912 the placement is adjusted and tested again at 908. If after a configured number of attempts the tray cannot be verified as having been placed securely, in various embodiments, the system prompts a human worker to assist it, e.g., by teleoperation or manual work.

Figure 10:
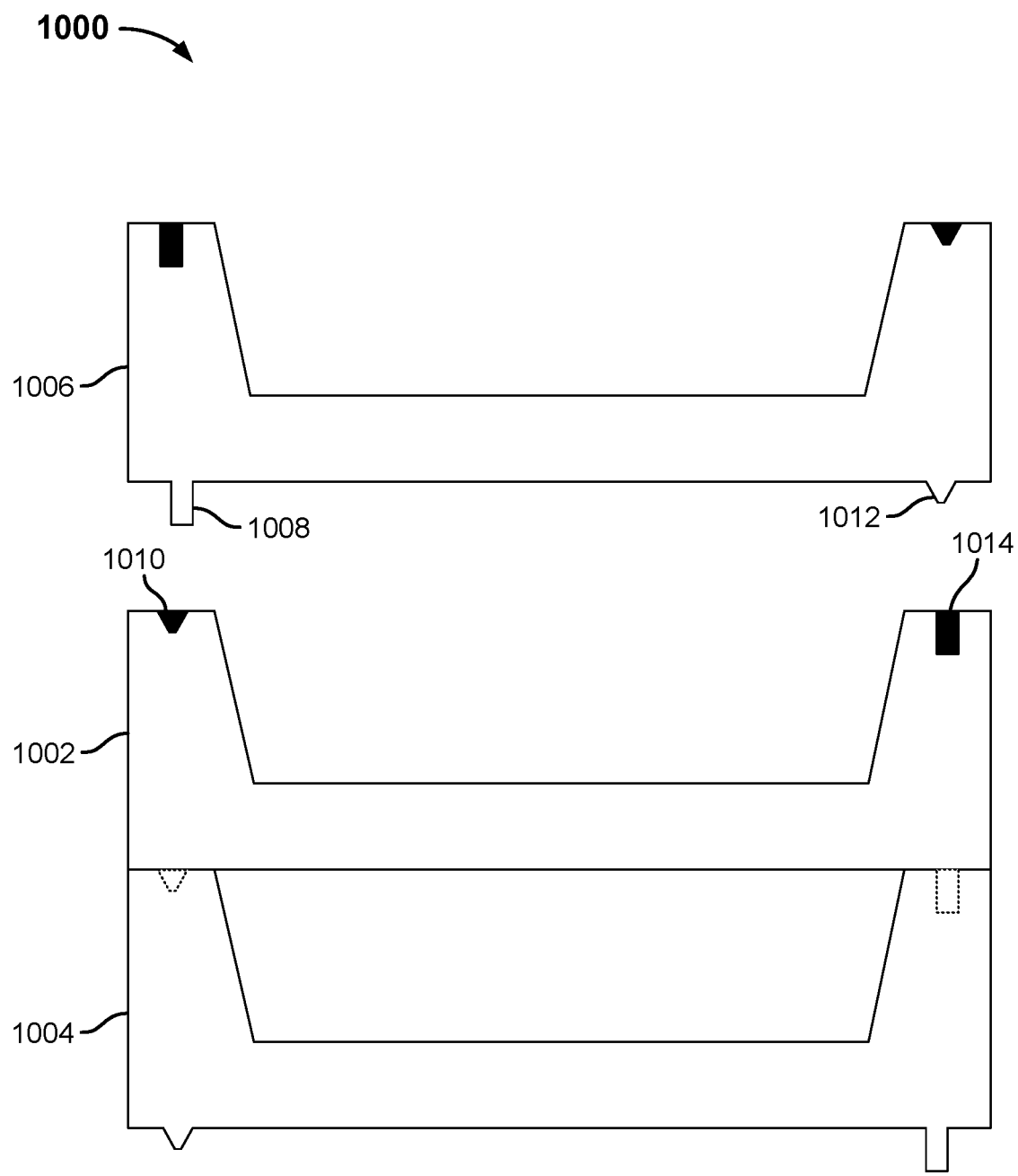
FIG. 10 is a diagram illustrating an example of a stack of trays configured to be stacked in a specific tray orientation.

FIG. 10 is a diagram illustrating an example of a stack of trays configured to be stacked in a specific tray orientation. In the example shown, destination stack 1000 includes a tray 1002 stacked on top of a tray 1004. A tray 1006 is to be added to the top of the stack 1000. The trays 1002, 1004, 1006 each include a pair of dissimilarly shaped recesses at the top of the tray, e.g., recesses 1010 and 1014 on the top of tray 1002, one a on first side and the other on the opposite side, and corresponding protrusions at the bottom of the tray, e.g., protrusions 1008 and 1012 at the bottom of tray 1006. As shown in FIG. 10, the protrusion 1008 is of a size and shape to fit into recess 1014, while protrusion 1012 is of a size and shape to fit into recess 1010. However, as shown tray 1006 is flipped around such that the protrusion 1008 is over recess 1010, which it does not match, while protrusion 1012 is positioned over recess 1014, which it also does not match.

In various embodiments, a tray handling robot system as disclosed herein learns and/or is trained to recognize a force sensor reading and/or profile associated with a misalignment as shown in FIG. 10. The system may detect, e.g., upon attempting to place the tray 1006 onto tray 1002, that the tray 1006 is not slotted securely onto tray 1002 in a way associated with the tray 1006 being flipped around into a reverse position, as shown in FIG. 10. In various embodiments, in response to detecting an incorrect orientation as shown in FIG. 10, the system lifts the tray (e.g., 1006) up, rotates the tray 180 degrees around the z (up/down) axis, and renews its attempt to place the tray on top of the destination stack.

Figure 11:
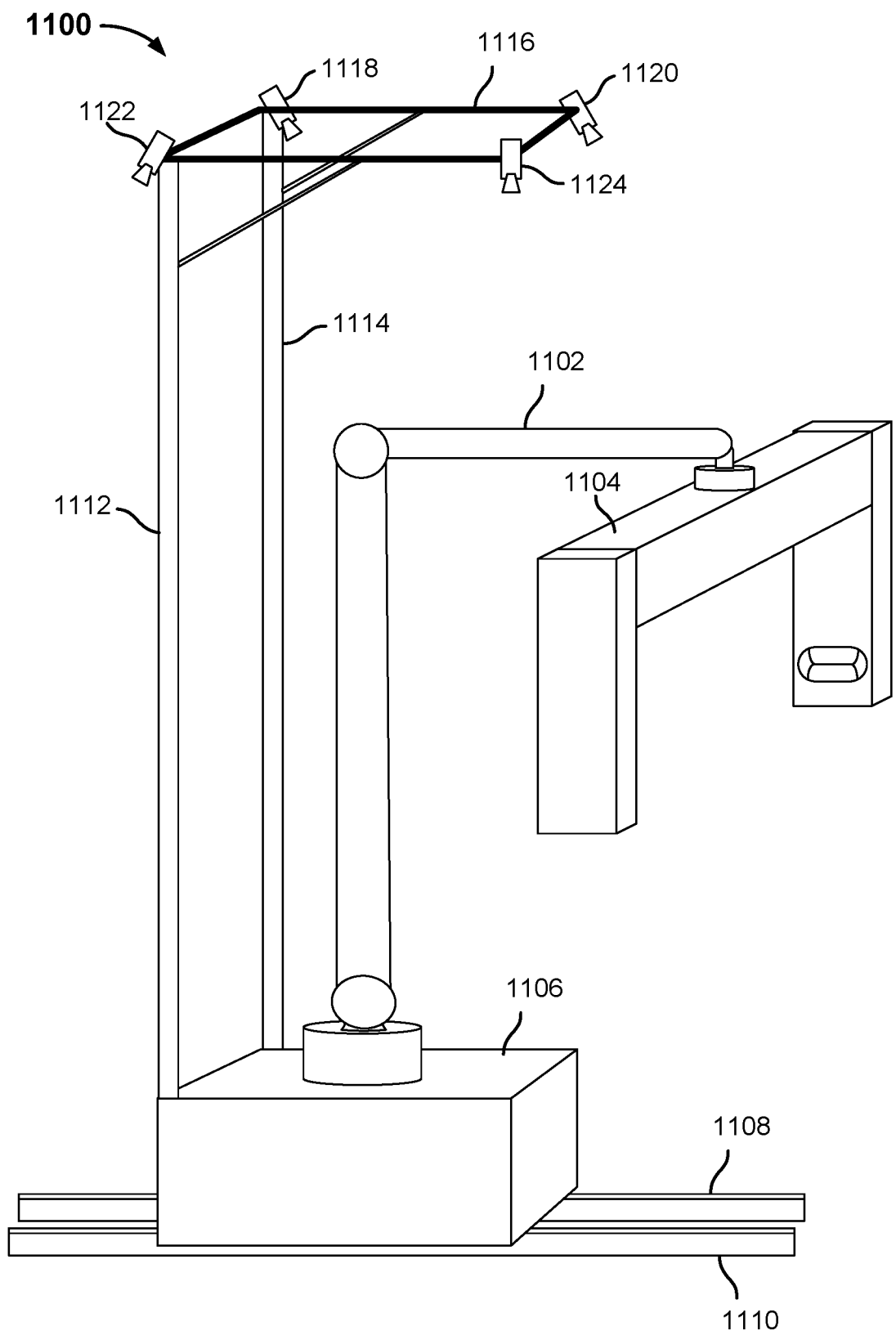
FIG. 11 is a diagram illustrating an embodiment of a tray handling robot.

FIG. 11 is a diagram illustrating an embodiment of a tray handling robot. In various embodiments, one or more robots such as robot 1100 of FIG. 11 may be included in a robotic tray handling system as disclosed herein, e.g., robots 112, 114 in FIGS. 1A and 1B. In the example shown, robot 1100 includes a robotic arm 1102 and tray handling end effector 1104 mounted on a chassis 1106 configured to be moved under robotic control along rails 1108 and 1110. A superstructure comprising vertical supports 1112 and 1114 and upper frame 1116 provides mounting locations for 3D cameras 1118, 1120, 1122, and 1124. In various embodiments, one or more 3D cameras may be placed near the base of the robot.

In various embodiments, robot 1100 is deployed in a tray handling system as shown in FIGS. 1A and 1B. Source tray stacks may be provided on one side of rails 1108 and 1110 (e.g., beyond rail 1108 as shown) and destination tray stacks may be built on an opposite side of rails 1108 and 1110 (e.g., on the side of rail 1110 nearer the viewer, as shown). Pairs of cameras on the source tray stack side (e.g., 1118, 1120) and destination tray stack side (e.g., 1122, 1124) are used to provide a view of relevant portions of the workspace in the vicinity in which the robot 1100 is located and working.

In various embodiments, the image data may be used to do one or more of the following: avoid collisions with other robots, tray stacks, and other items present in the workspace; plan trajectories; and position the end effector 1104 and/or a tray in the grasp of end effector 1104 in at least an initial position under position control.

In some embodiments, the cameras 1118, 1120, 1122, and 1124 are included in a vision system used to control of a robotic tray handling system as disclosed herein. In some embodiments, the vision system is designed to self-calibrate. The robot uses a marker that is installed on one of its joints and exposes the marker to the cameras in the system, e.g., cameras 1118, 1120, 1122, and 1124, which recognize the marker and perform a pose estimation to understand their own pose in world coordinates. The robot plans its motion using collision avoidance to get the marker into a position close to the cameras to get a high-quality calibration.

In some embodiments, a onetime manual process follows the automatic calibration to further ensure the quality of the process. A point cloud is overlaid on top of the simulated graphics of the system and a human operator performs the matching or the rendered graphics of the robot plus environment in a simulator to the point cloud as seen by the camera mounted on the robot. Further verification procedures are also in place to verify perceived depth of objects of known heights in the world frame (coordinates).

In some embodiments, a system as disclosed herein self-calibrates its own dimensions. The robot moves up and down the rail to find the pick and place locations and uses force control to find the coordinates of the input-output slots. It dynamically performs an update. For example, in some embodiments, the system uses specially designed calibration motions (including force control) to find the exact locations of each of the input and the output facings (where stacks of trays exist) referred to as the "layout", and updates layout values internally that many times reveal variations such as uneven ground surfaces, peripheral installation misalignments. The robot dynamically performs these updates through its lifespan, in various embodiments.

In some embodiments, the vision system approximates the pose of the target tray or the target destination stack to check the robot goal motions. A vision system scheduler guarantees simultaneous checks when it is possible to and both input and output targets are in the field of view.

In various embodiments, a single robot tray handling robotic system as disclosed herein enables destination (output) stacks to be assembled reliably, quickly, and efficiently by picking trays from source stacks and building destination (output) stacks according to a plan, e.g., based on order, invoice, manifest, or similar information.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. An autonomous tray handling robotic system, comprising:
a memory configured to store data indicating a set of output stacks to be assembled, each output stack including an associated set of trays each of a corresponding tray type; and
a processor coupled to the memory and configured to:
control operation of one or more robots, each configured to grasp, move, and place one or more trays at a time, according to a plan, to iteratively pick trays from source stacks of trays and assemble the set of output stacks, including by building each output stack by successively placing on the output stack trays picked from one or more corresponding source stacks;
pick a tray at least in part by using position control based on image data to move at least a passive side member of a tray handling end effector into a position adjacent to a first structure; and
use force control to insert into the first structure a protrusion comprising or attached to the passive side member, wherein each of the robots comprises a robotic arm and the tray handling end effector configured to grasp, move, and place one or more trays without assistance from another robot, wherein the tray handling end effector comprises a lateral member coupled to the robotic arm, the passive side member coupled to the lateral member at a first distal end and configured to engage mechanically with the first structure on a first side of the tray, and an active side member coupled to the lateral member at a second distal end opposite the first distal end and configured to engage mechanically with a second structure on a second side of the tray opposite the first side of the tray.

2. The autonomous tray handling robotic system of claim 1, wherein the first structure and the second structure each comprise one or more of a hole, a recess, and a handle.

3. The autonomous tray handling robotic system of claim 2, wherein the passive side member and the active side member each includes a corresponding structure configured to be inserted into the first structure and the second structure, respectively.

4. The autonomous tray handling robotic system of claim 1, wherein the active side member is configured to be placed in an open position via robotic control and processor is configured to operate the tray handling end effector in connection with an operation to pick the one or more trays from a source stack, including by sending to the tray handling end effector a signal to place the active side member in the open position.

5. The autonomous tray handling robotic system of claim 4, wherein the active side member is connected to the lateral member via a hinge, bolt, pin, or similar structure and is configured to be opened by rotating about a longitudinal axis of the hinge, bolt, pin, or similar structure into a position in which the active side member is parallel to the lateral member.

6. The autonomous tray handling robotic system of claim 1, wherein the tray comprises a bottommost tray of a set of two or more trays to be moved to a destination output stack.

7. The autonomous tray handling robotic system of claim 1, wherein the protrusion comprises a thumb structure configured to be inserted into the first structure.

8. The autonomous tray handling robotic system of claim 7, wherein the thumb structure has a plurality of convex faces to facilitate insertion into the first structure under force control.

9. The autonomous tray handling robotic system of claim 8, wherein the thumb structure includes one or more flat surfaces at an end nearest the passive side member, the one or more flat surfaces facilitating alignment between the tray handling end effector and the tray upon complete insertion of the thumb structure into the first structure under force control.

10. The autonomous tray handling robotic system of claim 1, wherein the processor is further configured to maintain the active side member of the tray handling end effector in an open position parallel to the lateral member as the protrusion of the passive side member is inserted into the first structure and to transition the active side member to a closed position once the protrusion of the passive side member has been determined to have been inserted successfully into the first structure.

11. The autonomous tray handling robotic system of claim 10, wherein the processor is further configured to close the active side member at least in part by using force control to insert an active side protrusion comprising the active side member into the second structure of the tray.

12. The autonomous tray handling robotic system of claim 11, wherein the processor is further configured to confirm its grasp of the tray at least in part by lifting the tray up and using a force sensor attached to the tray handling end effector to determine that forces and moments measured by the force sensor are consist with a successful grasp.

13. The autonomous tray handling robotic system of claim 12, wherein the processor is configured to take corrective action based on a determination that the grasp was not successful.

14. The autonomous tray handling robotic system of claim 1, wherein the processor is further configured to place the one or more trays on an output stack at least in part by moving the one or more trays into a hover position above the output stack and lowering the one or more trays onto the output stack.

15. The autonomous tray handling robotic system of claim 14, wherein the tray handling end effector includes guide fins each extending below a corresponding side member of the tray handling end effector to a distance such that a bottom edge of the guide fins extends below a bottom of a bottommost tray in the grasp of the tray handling end effector, the guide fins having a cross-sectional profile that flares out away from a central axis of the tray handling end effector and the tray, such that the distance between the respective bottom edges of the guide fins is greater than a width of the tray; and wherein the processor is further configured to place the one or more trays on the output stack at least in part by lowering the one or more trays until one or both of the guide fins engages mechanically with a topmost tray of the output stack and using force control to center the one or more trays over the output stack and lower the one or more trays onto a top of the topmost tray of the output stack.

16. The autonomous tray handling robotic system of claim 15, wherein the processor is further configured to perform a routine to determine that the one or more trays have been placed securely on the output stack.

17. The autonomous tray handling robotic system of claim 16, wherein the processor is further configured to detect based on readings from a force sensor coupled to the end effector that the one or more trays have been placed in a position that is 180 degrees out of phase in reference to a vertical axis of the output stack, and to take corrective action by lifting the one or more trays off the output stack, rotating the one or more trays about a z-axis of the one or more trays, and placing the one or more trays on the output stack.

18. The autonomous tray handling robotic system of claim 1, wherein the processor is configured to operate simultaneously two or more tray handling robots configured to ride along a shared set of one or more rails.

19. The autonomous tray handling robotic system of claim 18, wherein the source stacks are fed into a staging area or structure one a first side of the shared set of one or more rails and the output stacks are assembled on a second side of the shared set of one or more rails, opposite the first side.

20. A method of autonomous tray handling, comprising:
    storing data indicating a set of output stacks to be assembled, each output stack including an associated set of trays each of a corresponding tray type;
    controlling operation of one or more robots, each configured to grasp, move, and place one or more trays at a time, according to a plan, to iteratively pick trays from source stacks of trays and assemble the set of output stacks, including by building each output stack by successively placing on the output stack trays picked from one or more corresponding source stacks;
    picking a tray at least in part by using position control based on image data to move at least a passive side member of a tray handling end effector into a position adjacent to a first structure; and
    using force control to insert into the first structure a protrusion comprising or attached to the passive side member, wherein each of the robots comprises a robotic arm and the tray handling end effector configured to grasp, move, and place one or more trays without assistance from another robot, wherein the tray handling end effector comprises a lateral member coupled to the robotic arm, the passive side member coupled to the lateral member at a first distal end and configured to engage mechanically with the first structure on a first side of the tray, and an active side member coupled to the lateral member at a second distal end opposite the first distal end and configured to engage mechanically with a second structure on a second side of the tray opposite the first side of the tray.

21. A computer program product embodied in a non-transitory computer readable medium, comprising computer instructions for:
    storing data indicating a set of output stacks to be assembled, each output stack including an associated set of trays each of a corresponding tray type;
    controlling operation of one or more robots, each configured to grasp, move, and place one or more trays at a time, according to a plan, to iteratively pick trays from source stacks of trays and assemble the set of output stacks, including by building each output stack by successively placing on the output stack trays picked from one or more corresponding source stacks;
    picking a tray at least in part by using position control based on image data to move at least a passive side member of a tray handling end effector into a position adjacent to a first structure; and
    using force control to insert into the first structure a protrusion comprising or attached to the passive side member, wherein each of the robots comprises a robotic arm and tray handling end effector configured to grasp, move, and place one or more trays without assistance from another robot, wherein the tray handling end effector comprises a lateral member coupled to the robotic arm, the passive side member coupled to the lateral member at a first distal end and configured to engage mechanically with the first structure on a first side of the tray, and an active side member coupled to the lateral member at a second distal end opposite the first distal end and configured to engage mechanically with a second structure on a second side of the tray opposite the first side of the tray.

22. The method of claim 20, wherein the first structure and the second structure each comprise one or more of a hole, a recess, and a handle.

23. The method of claim 20, wherein the passive side member and the active side member each includes a corresponding structure configured to be inserted into the first structure and the second structure, respectively.

24. The method of claim 20, wherein the active side member is configured to be placed in an open position via robotic control and processor is configured to operate the tray handling end effector in connection with an operation to pick the one or more trays from a source stack, including by sending to the tray handling end effector a signal to place the active side member in the open position.

* * * * *